(12) United States Patent
Swaminathan et al.

(10) Patent No.: US 11,665,358 B2
(45) Date of Patent: May 30, 2023

(54) GENERATING MULTI-PASS-COMPRESSED-TEXTURE IMAGES FOR FAST DELIVERY

(71) Applicant: Adobe Inc., San Jose, CA (US)

(72) Inventors: Viswanathan Swaminathan, Saratoga, CA (US); Stefano Petrangeli, Mountain View, CA (US); Gwendal Simon, Rennes (FR)

(73) Assignee: Adobe Inc., San Jose, CA (US)

( * ) Notice: Subject to any disclaimer, the term of this patent is extended or adjusted under 35 U.S.C. 154(b) by 413 days.

(21) Appl. No.: 16/860,758

(22) Filed: Apr. 28, 2020

(65) Prior Publication Data

US 2021/0337222 A1    Oct. 28, 2021

(51) Int. Cl.
*H04N 19/00* (2014.01)
*H04N 19/192* (2014.01)
*H04N 19/186* (2014.01)
*H04N 19/176* (2014.01)

(52) U.S. Cl.
CPC ......... *H04N 19/192* (2014.11); *H04N 19/176* (2014.11); *H04N 19/186* (2014.11)

(58) Field of Classification Search
CPC ... H04N 19/192; H04N 19/176; H04N 19/186
See application file for complete search history.

(56) References Cited

U.S. PATENT DOCUMENTS

| | | | | |
|---|---|---|---|---|
| 2011/0115806 A1* | 5/2011 | Rogers | ...................... | G06T 9/00 345/582 |
| 2012/0081384 A1* | 4/2012 | Sorgard | ................... | G06T 9/00 345/582 |
| 2015/0235384 A1* | 8/2015 | Nystad | ...................... | G06T 9/00 345/582 |
| 2020/0003743 A1* | 1/2020 | van Schriek | ....... | G01N 33/0098 |
| 2020/0051285 A1* | 2/2020 | Wihlidal | ................ | H04N 19/40 |

OTHER PUBLICATIONS

Krajcevski, Pavel et al. "GST: GPU-decodable Supercompressed Textures"; Nov. 2016; The University of North Carolina at Chapel Hill; http://gamma.cs.unc.edu/GST/gst.pdf.

* cited by examiner

*Primary Examiner* — Zhihan Zhou
(74) *Attorney, Agent, or Firm* — Keller Preece PLLC

(57) ABSTRACT

The present disclosure relates to systems, methods, and non-transitory computer-readable media to enhance texture image delivery and processing at a client device. For example, the disclosed systems can utilize a server-side compression combination that includes, in sequential order, a first compression pass, a decompression pass, and a second compression pass. By applying this compression combination to a texture image at the server-side, the disclosed systems can leverage both GPU-friendly and network-friendly image formats. For example, at a client device, the disclosed system can instruct the client device to execute a combination of decompression-compression passes on a GPU-network-friendly image delivered over a network connection to the client device. In so doing, client device can generate a tri-pass-compressed-texture from a decompressed image comprising texels with color palettes based on previously reduced color palettes from the first compression pass at the server-side, which reduces computational overhead and increases performance speed.

20 Claims, 12 Drawing Sheets

GENERATING MULTI-PASS-COMPRESSED-TEXTURE IMAGES FOR FAST DELIVERY

BACKGROUND

Photogrammetry and photorealistic three-dimensional scenes typically require objects with high-fidelity details that include large texture images, particularly when uncompressed. Under recent advancements, the resolution of these objects is now frequently 8K. In addition, the number of texture images per object can be quite large. This trend is problematic given a limited transfer capacity over many users' network connection in addition to client device constraints in both memory and bandwidth. As such, a number of problems exist with conventional systems that lend to decreased compatibility with graphical processing units (GPUs) of client devices and network bandwidth and/or restrict compression methods to limited-use techniques, all of which can lead to suboptimal final quality.

With respect to decreased compatibility with client devices, conventional systems can transmit texture images that are not GPU friendly in at least a couple of ways. First, some conventional systems may transmit texture images to a client device such that the client device has no random access (i.e., is unable to extract and process data on a per-texel basis) for rendering the texture image. In so doing, the client device may be unable to render various effects in some textures indicative of light impinging a three-dimensional object (e.g., albedo, roughness, metal/specular, normal, ambient occlusion, etc.), among other potential rendering issues. Second, foregoing random access for texture images typically leads to a downgrade in quality. In particular, a full texture image often must be converted to a smaller sized version due to memory storage constraints, which results in an associated downgrade in quality. Third, some conventional systems may transmit texture images to a client device in a super-compressed state by compressing a texture image to directly execute network delivery. While this approach is more network friendly, it is not GPU friendly at the client device because decompression of such a super-compressed texture image is slow and computationally intensive. In turn, the client device can experience various issues such as streaming glitches, increased load time, decreased image quality, reduced color gamut, etc.

Further, some conventional systems can transmit texture images that are not network friendly. For example, some conventional systems transmit texture images that, notwithstanding some applied compression, are still quite large. In these or other embodiments, such conventional systems sacrifice network delivery speed in an attempt to maintain image quality and random access capabilities. Unfortunately, network speeds connecting devices are often insufficient to handle these images without causing rendering problems at the client device such as those mentioned above.

Additionally or alternatively, some conventional systems apply only limited-use compression methods. These limited-use compression methods typically involve custom compression algorithms for generating images or texture images in restricted formats. In decompressing and/or rendering images with such restricted formats, typical client devices are required to use additional hardware and/or software to convert the images in restricted formats (unusable) to a format of the images that the client device can use and perform its intended operations. As a further downside to limited-use compression algorithms, the foregoing conversion process can lead to usable formats that results in increased computational overhead at the client device.

SUMMARY

Aspects of the present disclosure can include methods, computer-readable media, and systems that utilize multi-pass compression to generate texture images for fast delivery and processing at a client device. In particular, the disclosed systems compress a texture image in a GPU-friendly manner utilizing a compression algorithm for graphical processing units (a CG1 compression). In particular, utilizing the CG1 compression techniques, the systems can generate a compressed-texture image comprising texels based on reduced color palettes defined by two respective endpoint colors. Additionally, in some embodiments, the disclosed systems decompress the compressed-texture image utilizing a decompression algorithm (a DG1 decompression) to generate a decompressed-GPU-friendly image. In turn, the disclosed systems can compress the decompressed-GPU-friendly image for network delivery utilizing a compression algorithm (a CN compression). Further, the disclosed systems can, after the CN compression, transmit a network-friendly image to a client device.

At the client device, the disclosed systems can decompress the network-friendly image to generate a second GPU-friendly image utilizing a decompression algorithm (a DN decompression). Due to the CG1 compression executed at the server-side, the second GPU-friendly image can comprise texels of either the same reduced color palettes or a slight variation of the reduced color palettes. For the texture images having a slight variation of the reduced color palettes, it may be appropriate in some cases to refer to these texture images as 'almost' or 'approximately' GPU-friendly since some of the texels are not yet arranged in the defined-endpoint fashion as described herein. With the reduced color palettes of the second GPU-friendly image, the disclosed systems can more rapidly generate a compressed-texture image that includes randomly accessible texels utilizing a compression algorithm (a CG2 compression). The disclosed systems can then use the compressed-texture image from the CG2 compression to render an object in a user interface of the client device.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
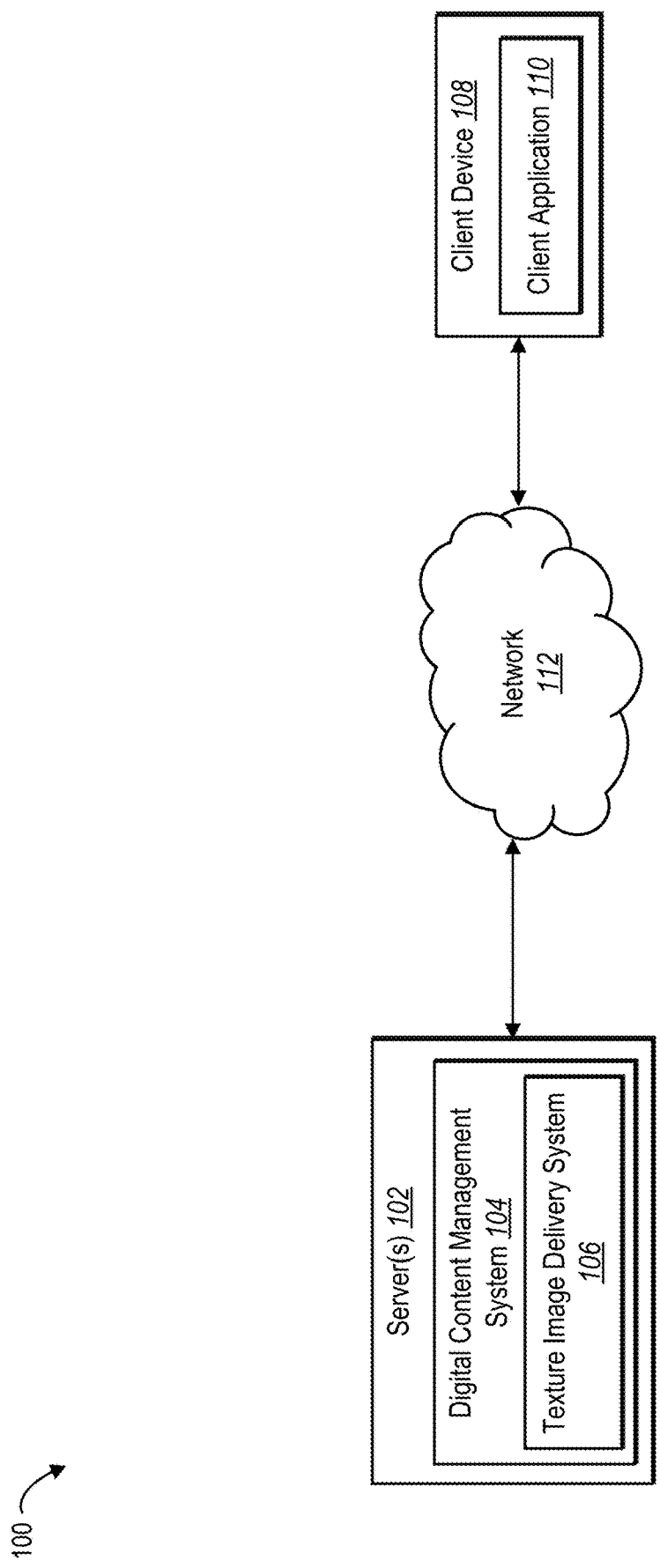
FIG. 1 illustrates a diagram of a system including a texture image delivery system in accordance with one or more embodiments.

One or more embodiments described herein include a texture image delivery system that utilizes combinations of compression techniques to enhance texture image delivery and processing at a client device. For example, in one or more embodiments, the texture image delivery system utilizes a server-side compression technique combination that includes, in sequential order, a first compression pass, a decompression pass, and a second compression pass. By applying this compression technique combination to a texture image at the server-side, the texture image delivery system can leverage both GPU-friendly and network-friendly image formats.

Then, at the client device, the texture image delivery system can execute a combination of decompression-compression passes on a GPU-network-friendly image delivered over a network connection to the client device. For example, the texture image delivery system can generate a decompressed image comprising texels with color palettes based on previously reduced color palettes from the first compression pass at the server. Thus, when the texture image delivery system applies a third compression pass to the decompressed image, the third compression pass executed is greatly simplified and sped up for enhanced processing and rendering performance.

As just mentioned, the texture image delivery system utilizes both server-side and client-side compression passes to generate a tri-pass-compressed texture image. In more detail at the server-side, the texture image delivery system can utilize a first compression algorithm such as, for example, DXT, block compressions (BCx), or adaptable scalable texture compression (ASTC) to reduce a color palette for each texel in a texture image to speed up processing at a GPU of a client device. Specifically, the texture image delivery system can utilize a first compression algorithm operable in a spatial-color domain to reduce a color palette for each texel of a texture image to four or less colors. In some implementations, performing the first compression algorithm can be computationally expensive, and therefore the texture image delivery system may cause one or more server devices to perform the first compression algorithm as opposed to a client device. In these or other embodiments, the color palette of each texel in the texture image is defined according to two endpoint colors, between which colors can be blended into one or two intermediary colors. The texture image delivery system can, after compressing the texture image utilizing the first compression algorithm, decompress the texture-compression image in preparation for a second compression pass.

In particular, the texture image delivery system can utilize a second compression algorithm that provides for efficient image compression for network delivery such as, for example, high efficiency image compression (HEIC), portable network graphics (PNG), or WebP. In one or more implementations, the texture image delivery system utilizes the second compression algorithm in a frequency domain. In this manner, the texture image delivery system can utilize universal compression algorithms with widely available libraries and increased compatibility between server-side and client-side. Once the texture image delivery system generates a dual-pass-compressed-texture image as just described, the texture image delivery system can transmit the dual-pass-compressed-texture image to a client device.

In turn at the client device, the texture image delivery system can decompress the dual-pass-compressed-texture image by decoding the network compression technique applied according to the second compression algorithm for efficient network delivery. In so doing, the texture image delivery system can generate a decompressed-texture image comprising texels with the same or similar color palettes generated according to the first compression algorithm performed at the server. The texture image delivery system can then generate a tri-pass-compressed-texture image utilizing a third compression algorithm. Because the decompressed-texture image comprises texels in approximately four or less colors, the texture image delivery system can bypass much of the computation for determining endpoint color values when generating the tri-pass-compressed-texture image. For example, many of the texels in the decompressed-texture image may already comprise four or less colors, in which case determining the end-point values is greatly simplified. Some texels will comprise five or more colors due to distortion. For such texels, the texture image delivery system can utilize color reduction algorithm to reduce the colors to four or less. In particular, the decompressed-texture image can utilize the color reduction algorithm to cluster the five or more colors of a given texel into four or less colors based on the five or more colors being predetermined as variations of the original four or less colors for the same texel produced by the first compression algorithm. In this manner, at the client device, the decompressed-texture image can quickly execute the third compression pass to generate the tri-pass-compressed-texture image (i.e., a GPU-friendly texture image) for passing to the GPU and subsequent rendering of an object.

The texture image delivery system provides several advantages over conventional systems. As one example, the texture image delivery system provides more GPU-friendly texture images to client devices. For instance, unlike some conventional systems, the texture image delivery system can transmit texture images to a client device such that each texel in the texture image is independent of each other and the client device has random access to these texels for rendering the texture image. Relative to conventional systems, the texture image delivery system further increases a compression speed at the client device for rendering the texture image. In particular, the texture image delivery system can simplify, to a great degree, the computational overhead at the client device by bypassing more computationally intensive portions of a compression algorithm due to the server-side dual-pass compression.

In addition, the texture image delivery system can provide more network-friendly images to a client device. For example, unlike some conventional systems, the texture image delivery system can provide images sufficiently compressed and/or sized to comport with typical bandwidth capacity and speed specifications of network connections connecting client devices to a server transmitting texture images. For instance, the texture image delivery system can utilize efficient network delivery image-compression algorithms to facilitate transmission of a texture image from the server-side to a client device.

Further, the texture image delivery system can utilize standardized or universal compression algorithms unlike some conventional systems. For example, the texture image delivery system can leverage widely-available image compression libraries for adaptive delivery of texture images to a variety of different client devices. By increasing flexibility to enable use of well-known compression techniques, the texture image delivery system can increase a compatibility with larger numbers and types of client devices capable of rendering an object using a texture image. In addition, the texture image delivery system can avoid the unnecessary conversion processes and the associated computational overhead (whether server-side and/or client-side) for converting restricted formats into a usable format. Indeed, one or more embodiment can employ widely-available compression algorithms, and thereby, avoid techniques that utilize a restricted format that is not widely accepted or compatible with client devices that can require an additional conversion process.

As illustrated by the foregoing discussion, the present disclosure utilizes a variety of terms to describe features and benefits of the texture image delivery system. Additional detail is now provided regarding the meaning of these terms. For example, as used herein, the term "texel" refers to a basic unit of a texture mapping (e.g., a texture image). In one or more embodiments, a texel comprises a grouping of pixels. In particular, a texel can include a block of pixels such as a four-by-four (4×4) block of pixels, an eight-by-eight (8×8) block of pixels, etc. A graphic processing unit (GPU) can utilize a texture image or texture map comprising a plurality of texels to mapped pixels from the texture image to a surface of an object (e.g., can wrap the texture around the object).

As further used herein, the term "texture-compression image" refers to a compressed version of a texture image generated using a compression algorithm (e.g., computer-implemented acts, processes, and/or techniques to reduce a byte size). Similarly, a "dual-pass-compressed-texture image" and a "tri-pass-compressed-texture image" refer to compressed versions of a texture image having been compressed two times and three times, respectively, utilizing one or more compression algorithms. For example, utilizing a first compression algorithm (e.g., DXT, block compression (BCx), adaptable scalable texture compression (ASTC), etc.), the texture image delivery system can compress a texture image to generate a texture-compression image. Likewise, utilizing a second compression algorithm (e.g., high efficiency image compression (HEIC), portable network graphics (PNG), WebP, JPEG, JPEG2000, etc.), the texture image delivery system can compress a decompressed-texture image (i.e., a decompressed version of a texture-compression image) to generate a dual-pass-compressed-texture image.

As also used herein, the term "domain" refers to an operable space for executing a compression algorithm. For example, a "spatial-color domain" can include a red-green-blue (RGB) color space, a luminance-chrominance (YUV) space, or other suitable color encoding system. As another example, a "frequency domain" can include a space defined according to the Fourier transform in which real and/or imaginary components can represent corresponding pixel values in the spatial-color domain.

Additionally, as used herein, the term "color palette" refers to a finite set of pixel colors for a group of pixels, such as a texel. In particular, a color palette can include discrete color values according to, for example, the spatial-color domain in which associated pixel colors in a texel. For instance, in some embodiments, a color palette for a texel can be represented in a somewhat linear fashion within the spatial-color domain, where two endpoint pixel colors (e.g., of greatest separating distance) define a line in the spatial-color domain along which intermediary pixel colors (i.e., pixel colors in-between the two endpoint pixel colors) representationally lay. Accordingly, in some embodiments utilizing one or more compression algorithms, the texture image delivery system arranges the pixel colors of a texel according to the color values (e.g., coordinates within the spatial-color domain) of the pixel colors by determining endpoint color values for endpoint pixel colors and intermediary color values (e.g., coordinates between the endpoint color values) for intermediary pixel colors. Further, in some embodiments utilizing one or more compression algorithms, the texture image delivery system can modify one or more pixel color values to correspond to a shared color value (e.g., by blending color values and/or mapping color values to a common color value).

As used herein, the term "texel dimension" or "dimension of a texel" refers to a number of pixel used to define the texel size. For example, the texel dimension of a 4×4 texel is four. Similarly, the texel dimension of an 8×8 texel is eight.

As also used herein, the term "color reduction algorithm" refers to computer-implemented acts, processes, and/or techniques that perform color quantization. In particular, a color reduction algorithm can reduce a color palette for a given texel having more colors than a dimension of the texel (e.g., five or more colors for 4×4 texels or nine or more colors for an 8×8 texel, etc.) to be equal to or less than the dimension of the texel (e.g., four or less colors for 4×4 texels or eight or less colors for 8×8 texels, etc.). For example, a color palette of a 4×4 texel may include five or more colors that are distorted from an original set of four or less colors. In turn, the texture image delivery system can utilize a color reduction algorithm to cluster the five or more colors into four or less colors in a variety of ways, for example, by iteratively applying rounded integer division to one or more color values.

Additional detail will now be provided regarding the texture image delivery system in relation to illustrative figures portraying example embodiments and implementations of the texture image delivery system. For example, FIG. 1 illustrates a computing system environment (or "environment") 100 for implementing a texture image delivery system 106 in accordance with one or more embodiments. As shown in FIG. 1, the environment 100 includes server(s) 102, a client device 108, and a network 112. Each of the components of the environment 100 can communicate via the network 112, and the network 112 may be any suitable network over which computing devices can communicate. Example networks are discussed in more detail below in relation to FIG. 8.

As shown in FIG. 1, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 8.

Although FIG. 1 illustrates a single client device 108, in some embodiments the environment 100 can include multiple client devices 108. The client device 108 can further communicate with the server(s) 102 via the network 112. For example, the client device 108 can receive one or more texture images that are both GPU-friendly and network-friendly from the server(s) 102 for rendering an object.

As shown, the client device 108 includes a corresponding client application 110. In particular, the client application 110 may be a web application, a native application installed on the client device 108 (e.g., a mobile application, a desktop application, etc.), or a cloud-based application where part of the functionality is performed by the server(s) 102. The client application 110 can present or display information to a user associated with the client device 108, including texture images for rendering content. In addition, the user can interact with the client application 110 to provide user input to, for example, select content for accessing, viewing, etc. at the client device 108. In one or more embodiments, at least a portion of the texture image delivery system is implemented by the client application 110 (e.g., the client-side acts).

As illustrated in FIG. 1, the environment 100 includes the server(s) 102. In some embodiments, the server(s) 102 comprises a content server and/or a data collection server. The server(s) 102 can also comprise an application server, a communication server, a web-hosting server, a social networking server, or a digital content management server. In particular, the server(s) 102 may learn, generate, modify, store, receive, and transmit electronic data, such as executable instructions for generating a multi-pass-compressed-texture image. For example, the server(s) 102 may receive data from the client device 108 indicative of a user input requesting digital content that includes one or more objects comprising texture images. In turn, the server(s) 102 can direct the texture image delivery system 106 to generate a dual-pass-compressed-texture image for transmitting to the client device 108. Further, the server(s) 102 can direct the client device 108 to apply one or more compression algorithms to the dual-pass-compressed-texture image to generate a tri-pass-compressed-texture image, which can be rapidly performed to increase a speed for subsequent rendering and display of an object at the client device 108.

Although FIG. 1 depicts the texture image delivery system 106 located on the server(s) 102, in some embodiments, the texture image delivery system 106 may be implemented by on one or more other components of the environment 100 (e.g., by being located entirely or in part at one or more of the other components). For example, texture image delivery system 106 may be implemented by the client device 108 and/or a third-party device.

As shown in FIG. 1, the texture image delivery system 106 is implemented as part of a digital content management system 104 located on the server(s) 102. The digital content management system 104 can create, organize, manage, and/or execute application of texture images. For example, the digital content management system 104 can obtain and/or generate texture images and direct the texture image delivery system 106 to provide the texture images to the client device 108. Additionally or alternatively, the digital content management system 104 can provide various instructions to the texture image delivery system 106 and/or the client device 108, for example, regarding compression and/or decompression of a texture image.

In some embodiments, the environment 100 may have a different arrangement of components and/or may have a different number or set of components. For example, the environment 100 may include a third-party server (e.g., for providing digital content to the texture image delivery system 106 with texture images). As another example, the client device 108 may communicate directly with the texture image delivery system 106, bypassing the network 112.

Figure 2A:
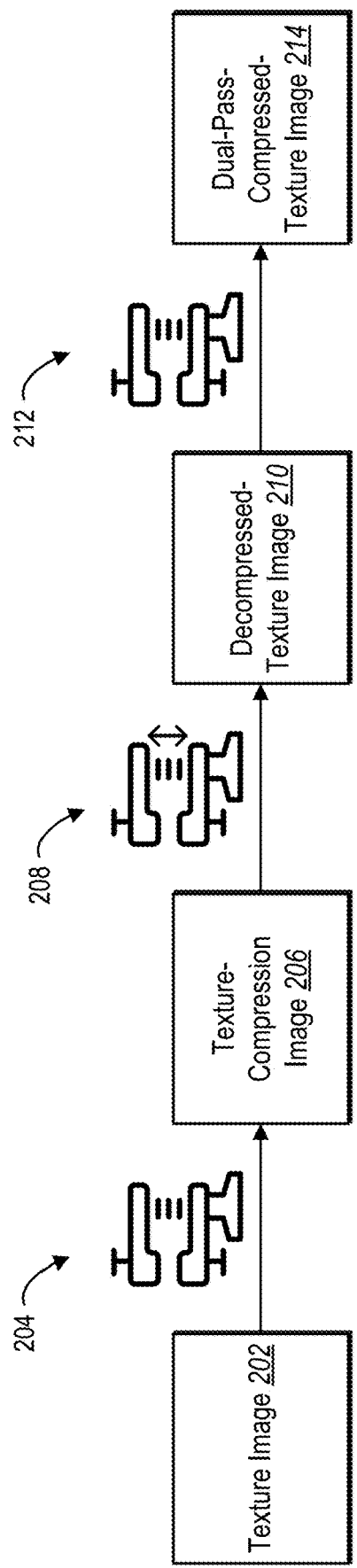
FIG. 2A illustrates a schematic diagram of a texture image delivery system generating a dual-pass-compressed-texture image in accordance with one or more embodiments.

As mentioned above, the texture image delivery system 106 can provide to a client device a dual-pass-compressed-texture image that can leverage both GPU-friendly and network-friendly image formats that are widely available to or compatible with computing devices. FIG. 2A illustrates a schematic diagram of the texture image delivery system 106 generating a dual-pass-compressed-texture image 214 in accordance with one or more embodiments of the present disclosure. In particular, FIG. 2A shows the texture image delivery system 106 utilizing compression algorithms 204, 212 and a decompression algorithm 208 to generate the dual-pass-compressed-texture image 214.

In more detail, the texture image delivery system 106 can apply the first compression algorithm 204 to the texture image 202 to generate a texture-compression image 206. In general, the texture image delivery system 106 can utilize the first compression algorithm 204 to modify color palettes for texels in the texture image 202 to generate texels comprising color palettes of four or less colors to generate the texture-compression image 206. For example, the texture image delivery system 106 can utilize a first compression algorithm 204 comprising one or more of DXT compression, BCx compression, ASTC compression, etc. Moreover, by utilizing the first compression algorithm 204, the texture image delivery system 106 imparts GPU-friendly characteristics to the texture-compression image 206 (e.g., by defining endpoints of the color palettes of each texel, which facilitates more rapid image decompression/compression at the client device).

In turn, the texture image delivery system 106 can apply the decompression algorithm 208 to the texture-compression image 206 to generate a decompressed-texture image 210. In particular, the texture image delivery system 106 can decompress the texture-compression image 206 to generate a decompressed-texture image 210 with texels comprising the color palettes of four or less colors. In these or other embodiments, the texture image delivery system 106 applies the decompression algorithm 208 to the texture-compression image 206 utilizing a decompressor that decodes one or more techniques applied according to the first compression algorithm 204 (e.g., by applying one or more inverse operations in reverse sequential order relative to the first compression algorithm 204). Additionally or alternatively, the texture image delivery system 106 may apply the decompression algorithm 208 to the texture-compression image 206 to generate the decompressed-texture image 210 in an image format that is compatible with application of the second compression algorithm 212. For example, in some embodiments, the first compression algorithm 204 and the second compression algorithm 212 are operable in different domains. Specifically, in some embodiments, the first compression algorithm 204 is operable in the spatial-color domain, and the second compression algorithm 212 is operable in the frequency-domain. Thus, prior to applying the second compression algorithm 212 operable in the frequency domain, the texture image delivery system 106 in certain implementations converts the texture-compression image 206 from an image format based in the spatial-color domain by applying the decompression algorithm 208 to the texture-compression image 206 to generate the decompressed-texture image 210. In other embodiments, however, the first compression algorithm 204 and the second compression algorithm 212 are operable in the same domain.

After generating the decompressed-texture image 210, the texture image delivery system 106 can then apply the second compression algorithm 212 to the decompressed-texture image 210. In so doing, the texture image delivery system 106 can generate the dual-pass-compressed-texture image 214. In these or other embodiments, the second compression algorithm 212 can comprise one or more of HEIC compression, PNG compression, WebP compression, JPEG compression etc. Moreover, by applying the second compression algorithm 212 to the decompressed-texture image 210, the texture image delivery system 106 can impart network-friendly characteristics to the dual-pass-compressed-texture image 214 (e.g., with a higher compression ratio and decreased byte size relative to the texture-compression image 206 and the decompressed-texture image 210, which facilitates decreased network bandwidth consumption and increased compatibility with lower network speeds of client devices).

Figure 2B:
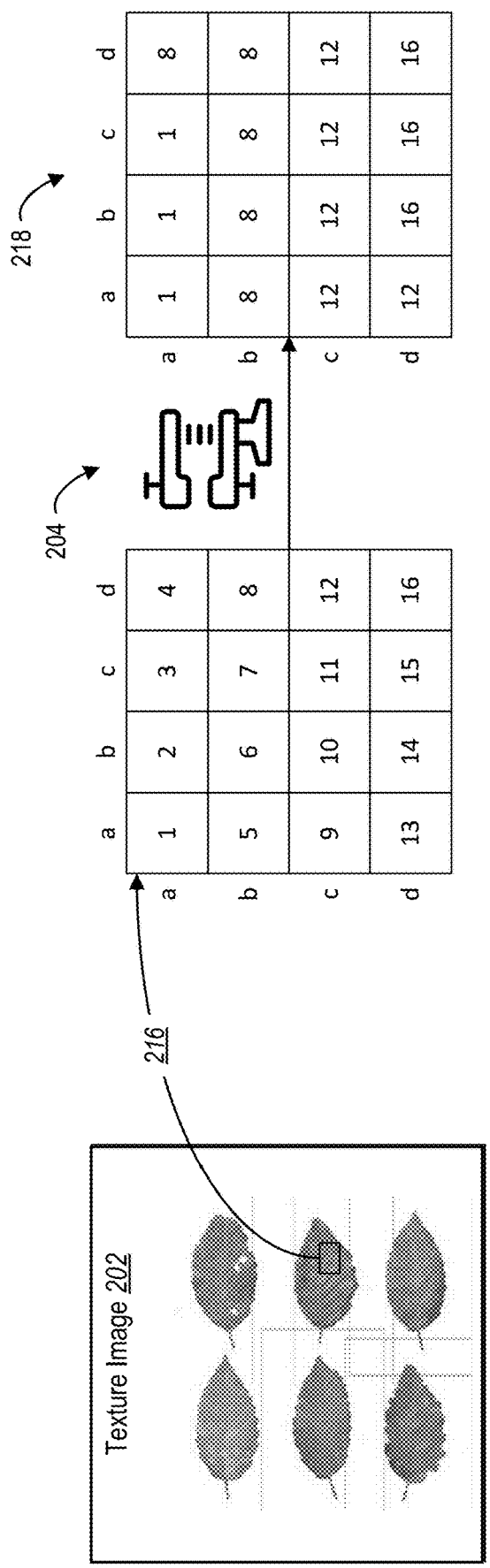
FIG. 2B illustrates a texture image delivery system applying a first compression algorithm to a texel of a texture image in accordance with one or more embodiments.

As just described in relation to FIG. 2A, the texture image delivery system 106 can apply multiple compression passes to a texture image as part of generating a dual-pass-compressed-texture image. FIG. 2B therefore illustrates, in greater detail, the texture image delivery system 106 applying the first compression algorithm 204 to a texel 216 of the texture image 202 in accordance with one or more embodiments. In particular, by applying the first compression algorithm 204 to the texel 216, the texture image delivery system 106 can compress the texel 216 to generate a modified texel 218 with a color palette comprising four or less colors. Moreover, by iteratively doing so for each texel in the texture image 202, the texture image delivery system 106 can generate the texture-compression image 206 as described above in relation to FIG. 2A.

As represented in FIG. 2B, the texel 216 is just one of many texels comprising the texture image 202. In addition, each texel in the texture image 202 may comprise a four-by-four pixel structure (with rows and columns labeled in FIG. 2 as having index values "a" through "d" for illustration) similar to that shown with respect to the texel 216. In these or other embodiments, texels in the texture image 202 can each comprise a variety of different pixel color values and a variety of different arrangements or combinations of pixel color values, without limitation. For ease and clarity of illustration and discussion, the texel 216 in FIG. 2B is shown in an example arrangement with pixel color values 1-16 representing spatial-color domain coordinates corresponding to pixels indexed from (a,a) to (d,d) in (row,column) format. In this example embodiment, the pixel color value 1 is separated farthest from the pixel color value 16 in the spatial-color domain, with pixel color values 2-15 spatially positioned therebetween in the spatial-color domain.

When applying the first compression algorithm 204 to the texel 216, the texture image delivery system 106 can determine the endpoint pixel colors of the texel 216 to generate a modified color palette in the modified texel 218. That is, the texture image delivery system 106 can utilize the first compression algorithm 204 to determine the two endpoint pixel color values farthest apart in the spatial-color domain (e.g., selecting the endpoint pixel color values with the greatest Euclidean distance therebetween). For example, the texture image delivery system 106 can utilize the first compression algorithm 204 to determine the two endpoint pixel color values which, within the spatial-color domain, would include the intermediary pixel color values positioned therebetween. In some embodiments, this involves the texture image delivery system 106 searching for the endpoint pixel color values by analyzing each pixel in the texel 216. Additionally or alternatively, the texture image delivery system 106 can identify the two endpoint pixel color values in such a way as to minimize an amount of error or distortion introduced in the modified texel 218, which in some implementations is an NP-hard problem to compute the shortest vector on a lattice. In the particular example illustrated in FIG. 2B, the texture image delivery system 106 can apply the first compression algorithm 204 to the texel 216 to determine that the two endpoint pixel color values for the texel 216 are 1 and 16 associated with pixels indexed at (a,a) and (d,d), respectively.

After determining the endpoint pixel color values (in this case, 1 and 16), the texture image delivery system 106 can generate the modified texel 218 with a reduced color palette by modifying one or more of the pixel colors to correspond to the respective endpoint colors. For example, as shown in FIG. 2B, the texture image delivery system 106 can utilize the first compression algorithm 204 to change the pixel (a,b) from a pixel color value of "2" to a pixel color value of "1," and likewise the pixel (a,c) from a pixel color value of "3" to a pixel color value of "1." Similarly, with respect to the other endpoint color, the texture image delivery system 106 can utilize the first compression algorithm 204 to change the pixel (d,b) from a pixel color value of "14" to a pixel color value of "16," and likewise the pixel (d,c) from a pixel color value of "15" to a pixel color value of "16." In these or other embodiments, the texture image delivery system 106 can modify more or fewer pixels to correspond to the respective endpoint colors.

For representing the intermediary colors and their associated pixel color values in the reduced color palette of the modified texel 218, the texture image delivery system 106 can utilize the first compression algorithm 204 to blend pixel color values for one or more intermediary pixel colors between the two respective endpoint pixel colors in the texel 216. For example, the texture image delivery system 106 can determine the intermediary pixel colors between the endpoint pixel colors by interpolating between the endpoint pixel color values (i.e., interpolating spatial-color domain coordinates in this case represented by "1" and "16").

Based on the blending of one or more pixel color values for the one or more intermediary pixel colors between the two respective endpoint pixel colors in the texel 216, the texture image delivery system 106 can generate the modified texel 218 with a reduced color palette by modifying one or more of the intermediary pixel colors in the texel 216 to correspond to blended intermediate colors. For example, as shown in FIG. 2B, the texture image delivery system 106 can utilize the first compression algorithm 204 to change the pixel (b,a) from a pixel color value of "5" to a pixel color value of "8," and likewise the pixel (b,b) from a pixel color value of "6" to a pixel color value of "8," and so forth. Similarly, with respect to generating another blended intermediary color, the texture image delivery system 106 can utilize the first compression algorithm 204 to change the pixel (c,a) from a pixel color value of "9" to a pixel color value of "12," and likewise the pixel (c,b) from a pixel color value of "10" to a pixel color value of "12," and so forth. In these or other embodiments, the texture image delivery system 106 can modify more or fewer pixels to correspond to the respective blended intermediary colors.

Further, in some embodiments, the blended intermediary pixel color values correspond to different pixel color values, for example, based on a spatial spread between the endpoint pixel color values of the texel 216, a desired interpolation step size, etc. For instance, the texture image delivery system 106 may generate the modified texel 218 with intermediary pixel color values corresponding to a slightly different shade of color not necessarily present in the texel 216 (e.g., pixel color values of 7.5 and 11.8 instead of 8 and 12) that better represent the combination of intermediary pixel color values between a set of endpoint pixel color values. Additionally or alternatively, the texture image delivery system 106 may generate the modified texel 218 with intermediary pixel color values corresponding to specific step sizes, for example, such that a first intermediary color is ⅔ of a first (or closer) endpoint pixel color and ⅓ of a second (or farther) endpoint pixel color; and likewise that a second intermediary color is ⅓ of the first (or farther) endpoint pixel color and ⅔ of the second (or closer) endpoint pixel color. In this manner, the texture image delivery system 106 can generate the modified texel 218 with a reduced color palette comprising four or less colors for increased GPU-friendliness.

By iteratively processing each texel in the texture image 202 to reduce the color pallet to four or less colors, the texture image delivery system 106 can generate the texture-compression image 206 as described above in relation to FIG. 2A. The texture image delivery system 106 can then apply the decompression algorithm 208 to the texture-compression image 206 to generate a decompressed-texture image 210. After generating the decompressed-texture image 210, the texture image delivery system 106 can then apply the second compression algorithm 212 to the decompressed-texture image 210 to generate the dual-pass-compressed-texture image 214. Additionally or alternatively, the texture image delivery system 106 can perform the same or similar acts and algorithms as just described for larger texels (e.g., 8×8 texels).

Figure 3A:
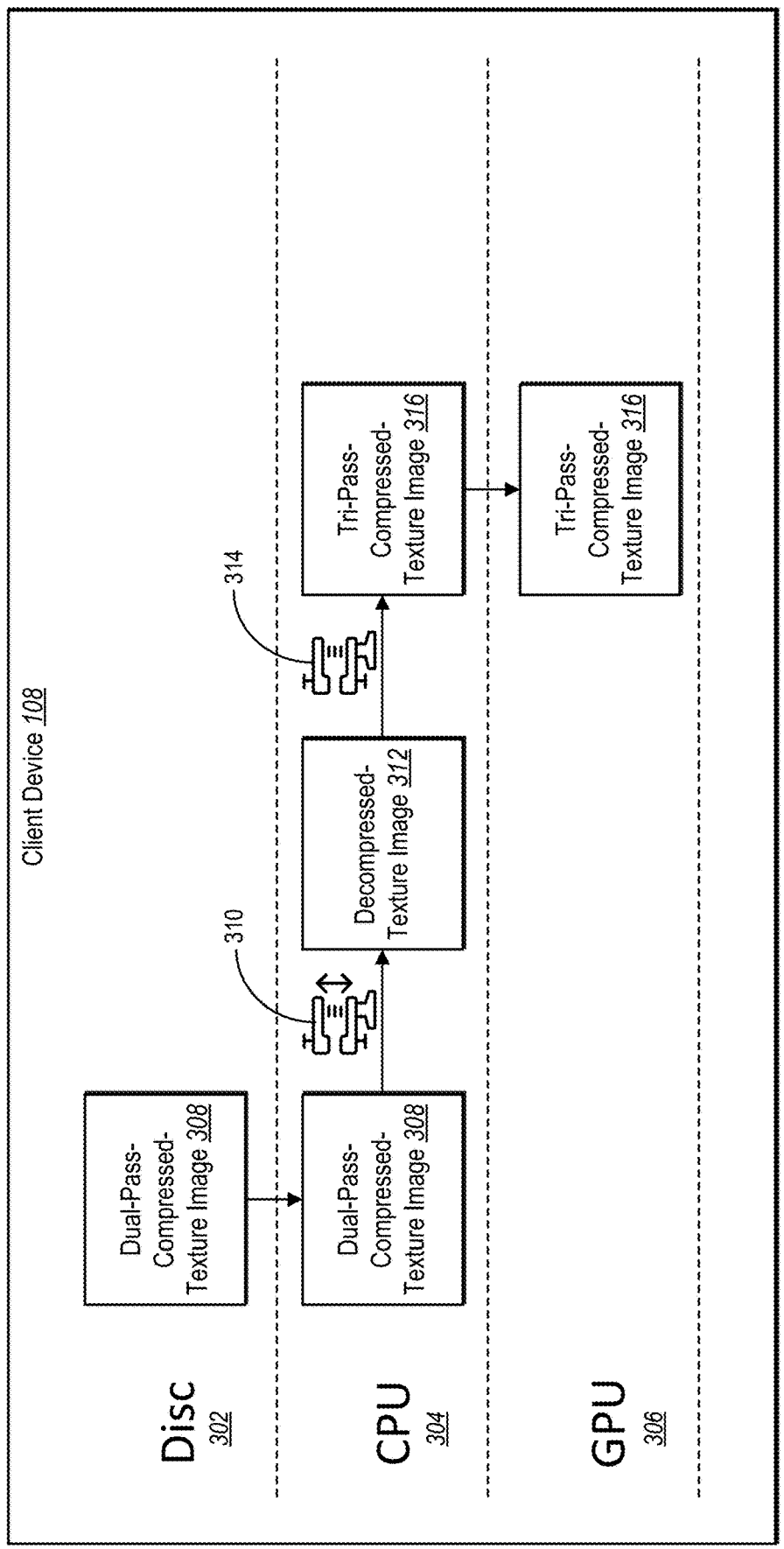
FIGS. 3A-3C illustrate a client device utilizing a third compression algorithm to generate a tri-pass-compressed-texture image in accordance with one or more embodiments.

As mentioned above the texture image delivery system 106 can generate a network-friendly and GPU-friendly image in the form of a dual-pass-compressed-texture image for transmitting to a client device. FIG. 3A illustrates the client device 108 receiving a dual-pass-compressed-texture image 308 and utilizing a third compression algorithm 314 to generate a tri-pass-compressed-texture image 316 in accordance with one or more embodiments of the present disclosure. As shown, the client device 108 comprises a hard-drive or disc 302, a central processing unit or CPU 304, and a graphics processing unit or GPU 306. The client device 108 can receive the dual-pass-compressed-texture image 308 from the texture image delivery system 106, in which case the dual-pass-compressed-texture image 308 may be the same as or similar to the dual-pass-compressed-texture image 214 discussed above in relation to FIG. 2A. The client device 108 can then store the dual-pass-compressed-texture image 308 on the disc 302. From the disc 302, the client device 108 can provide the dual-pass-compressed-texture image 308 to the CPU 304 (and/or the GPU 306).

After receiving the dual-pass-compressed-texture image 308 at the CPU 304, the client device 108 can apply a decompression algorithm 310 to the dual-pass-compressed-texture image 308 to generate a decompressed-texture image 312, for example, utilizing a decompressor that decodes, dequantizes, and inverse maps the dual-pass-compressed-texture image 308. In particular, the client device 108 can generate the decompressed-texture image 312 from the dual-pass-compressed-texture image 308 by decoding a second compression technique applied at server-side in accordance with the second compression algorithm 212 discussed above in relation to FIG. 2A to generate the dual-pass-compressed-texture image 308.

In some embodiments, the decompressed-texture image 312 comprises the same or similar color palettes of texels as generated in the texture-compression image 206 and the decompressed-texture image 210 discussed above in relation to FIG. 2A. Accordingly, the client device 108 can, at the CPU 304, more advantageously (i.e., in a less computationally-intensive way) apply the third compression algorithm 314 to the decompressed-texture image 312 to generate the tri-pass-compressed-texture image 316 as a GPU-friendly texture image. This process of applying the third compression algorithm 314 to the decompressed-texture image 312 to generate the tri-pass-compressed-texture image 316 is described in more depth below in relation to FIGS. 3B-3C. In general though, the client device 108 can more quickly compress the decompressed-texture image 312 utilizing the third compression algorithm 314 because each of the texels in the decompressed-texture image 312 is approximately (if not already) in a respective two-endpoint defined color palette. In turn, after generating the tri-pass-compressed-texture image 316 at the CPU 304, the client device 108 can provide the tri-pass-compressed-texture image 316 to the GPU 306 for subsequent rendering of an object represented with the tri-pass-compressed-texture image 316.

In other embodiments, the texture image delivery system 106 can instruct the client device 108 to utilize a different configuration and/or implementation other than that illustrated in FIG. 3A. For example, in one or more embodiments, the GPU 306 can perform, in whole or in part, the decompression algorithm 310 and/or the third compression algorithm 314.

Figure 3B:
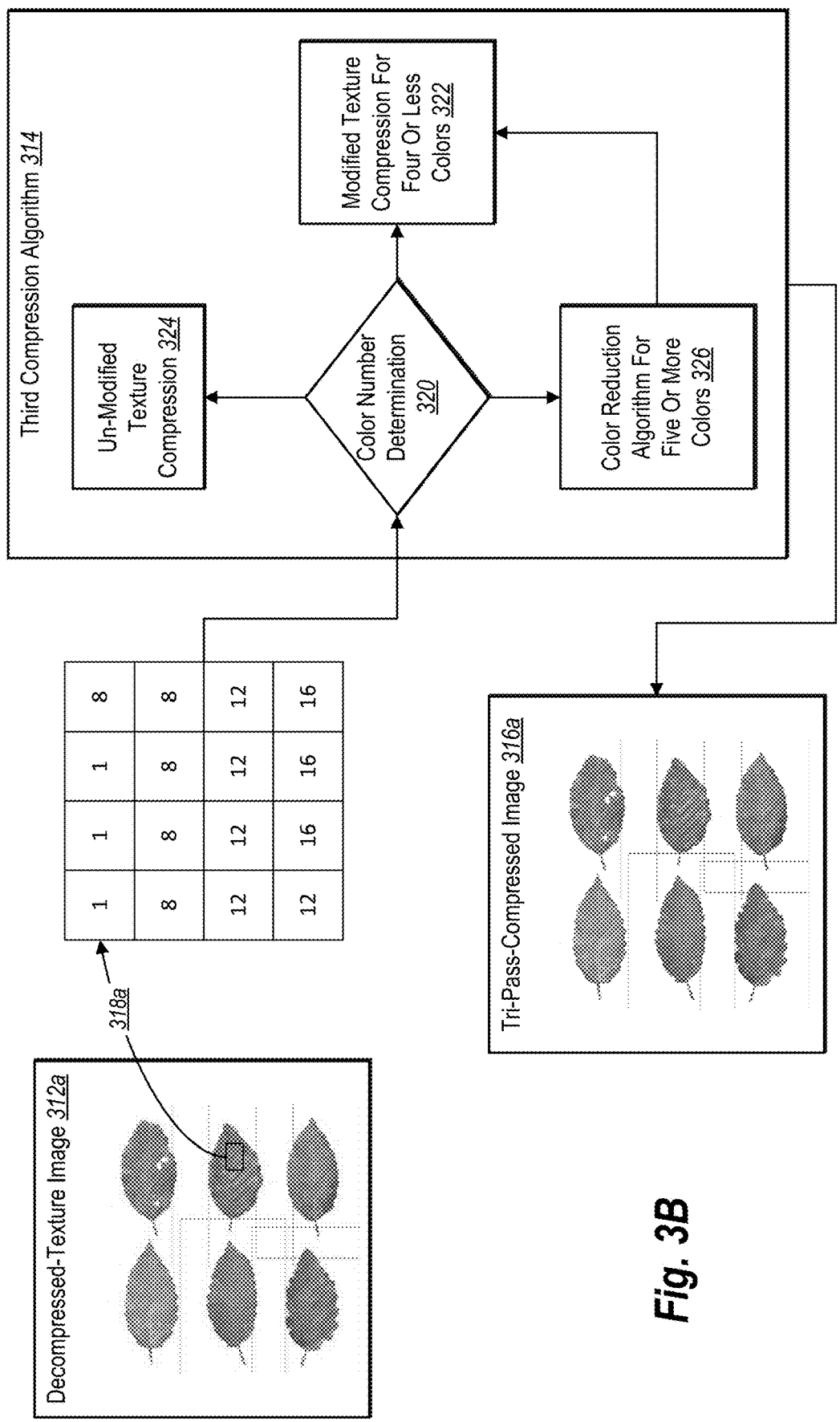
Figure 3C:
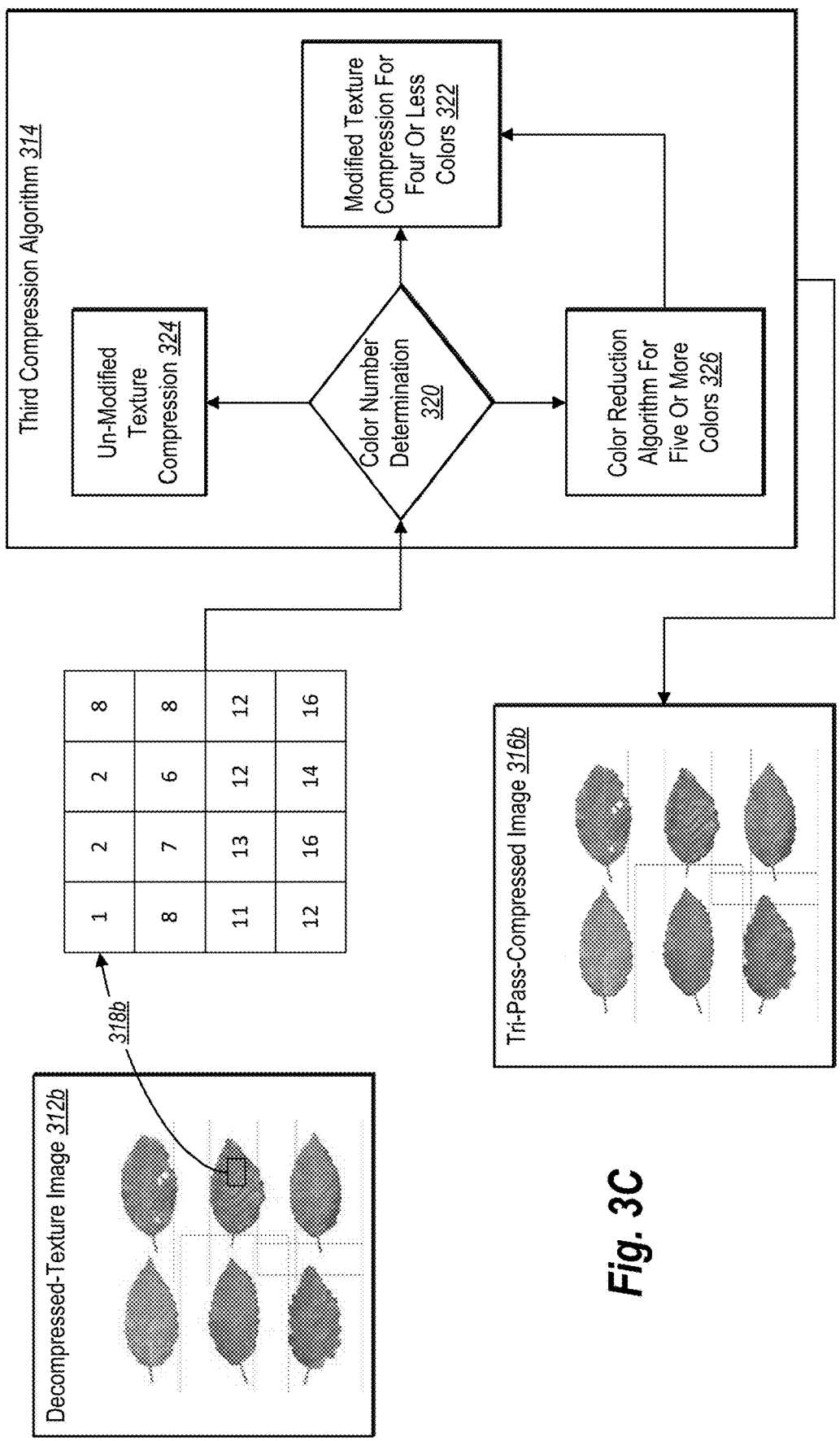

As just mentioned, the client device 108 can more advantageously apply the third compression algorithm 314 to the decompressed-texture image 312 to generate the tri-pass-compressed-texture image 316. FIGS. 3B-3C therefore illustrate, in greater detail, the client device 108 utilizing the third compression algorithm 314 to generate a tri-pass-compressed-texture image in accordance with one or more embodiments. In particular, FIG. 3B shows the client device 108 applying the third compression algorithm 314 to a decompressed-texture image 312a comprising texel 318a having little to no distortion (i.e., little or no changes to the reduced color palette) relative to the modified texel 218 described above in relation to FIG. 2B. Thus, at a color number determination act 320 of the third compression algorithm 314, the client device 108 can determine that the texel 318a comprises four or less colors in this case corresponding to pixel color values 1, 8, 12, and 16.

In response to determining that the texel 318a comprises four or less colors, the client device 108 can utilize a modified texture compression for four or less colors at act 322 of the third compression algorithm 314. Specifically, rather than analyzing pixel by pixel to search for the two endpoint pixel color values as described above in relation to FIG. 2B, the client device 108 can assume that the texel 318a is already in a two-endpoint defined color palette. Thus, at act 322 of the third compression algorithm 314, the client device 108 can bypass a significant portion of computation and select (as the endpoint pixel color values) the pair of pixel color values that each has a least distance to an intermediary pixel color value. Additionally or alternatively, the client device 108 can utilize act 322 of the third compression algorithm 314 to select (as the endpoint pixel color values) the pair of pixel color values that define a compressed color palette for the texel 318a according to a line with a minimized distance to the intermediary pixel color values of the texel 318a. For instance, in some embodiments, the client device 108 may select the endpoint pixel color values as 1 and 16 if a line connecting the pixel color values 1 and 16 in the spatial-color domain has a minimized distance to intermediary pixel color values 8 and 12. Based on the selected endpoint pixel color values for the texel 318a, the client device 108 can utilize the third compression algorithm 314 to complete the texture compression for the texel 318a and provide the texture-compressed texel to one or more components of the client device 108 for generating a tri-pass-compressed-texture image 316a.

Additionally or alternatively to act 322 of the third compression algorithm 314, the client device 108 may utilize the un-modified texture compression technique at act 324 and perform corresponding acts and algorithms to perform a search for the two endpoint pixel color values as described above in relation to FIG. 2B. In some implementations, the un-modified texture compression technique at act 324 comprises utilizing a GPU specific texture compression technique. In these or other embodiments at act 324 of the third compression algorithm 314, the client device 108 does not assume that the texel 318a is already in a two-endpoint defined color palette. This approach, although slower than utilizing act 322, is still faster than methods employed by other systems due to the texel 318a being in a reduced-color palette format. In turn, the client device 108 can generate a compressed texel color palette, which may be the same as or similar to the compressed texel color palette when utilizing act 322 of the third compression algorithm 314. Further, although illustrated in FIG. 3B, the client device 108 may choose not to perform act 326 of the third compression algorithm 314 based on the color number determination 320 indicating the texel 318a comprises four or less colors.

In FIG. 3C, the client device 108 applies the third compression algorithm 314 to a decompressed-texture image 312b comprising texel 318b having some distortion (i.e., some changes to the reduced color palette) relative to the modified texel 218 described above in relation to FIG. 2B. Thus, at a color number determination 320 of the third compression algorithm 314, the client device 108 can determine that the texel 318b comprises five or more colors in this case corresponding to pixel color values 1, 2, 6, 7, 8, 11, 12, 13, 14, and 16.

In response to determining that the texel 318b comprises five or more colors, the client device 108 can utilize a color reduction algorithm at act 326 of the third compression algorithm 314. In some embodiments, the color reduction algorithm clusters the five or more colors of the texel 318b into four or less colors. In these or other embodiments, clustering the five or more colors into four or less colors comprises modifying one or more of the pixel color values until mapping to a shared color value. For example, in some embodiments, the client device 108 can, at act 326 of the third compression algorithm 314, modify one or more pixel color values of a pixel until mapping to a shared color value by iteratively applying rounded integer division to the one or more pixel color values and/or iteratively applying other suitable arithmetic operations for clustering the one or more pixel color values. Additionally or alternatively, the client device 108 can, at act 326 of the third compression algorithm 314, apply a three-dimensional clustering algorithm and/or various other suitable algorithms, such as, for example, a k-means clustering algorithm, a spatial color quantization algorithm, etc.

After reducing the number of colors of the texel 318b, the client device 108 can utilize act 322 of the third compression algorithm 314 as described above in relation to FIG. 3B to perform a modified texture compression for the texel 318b reduced to four or less colors. Additionally or alternatively to act 326 or act 322 of the third compression algorithm 314, the client device 108 may utilize the un-modified texture compression technique at act 324 and perform corresponding acts and algorithms to perform a search for the two endpoint pixel color values as described above in relation to FIGS. 2B and 3B. In turn, the client device 108 can generate from act 324 a compressed texel color palette, which may be the same as or similar to the compressed texel color palette when utilizing acts 326 and 322 of the third compression algorithm 314. Additionally or alternatively to the foregoing, the texture image delivery system 106 may perform the same or similar acts and algorithms as just described for larger texels. For example, in the case of an 8×8 texel, the texture image delivery system 106 can determine four endpoint color values (e.g., by reducing a color palette from nine or more colors to be eight or less colors).

In any event, the client device 108 generates the tri-pass-compressed texture image 316. As described above, the tri-pass-compressed texture image 316 can comprises independently compressed texels, which allows the texels to be randomly accessible. The process of generating the dual-pass compressed-texture image 308, passing the dual-pass-compressed texture image 308 over a network to the client device 108, generating the tri-pass-compressed-texture image 316, and enabling the GPU 306 to render an object utilizing the tri-pass-compressed-texture image 316 provides various technical advantages. In particular, this process provides the advantages of both shipping GPU-friendly image formats (DXT, BCx) that enable random-access by the renderer and delivering network-friendly image formats (WebP, HEIC) between the server and the client. Furthermore, this process provides both advantages without the drawback of requiring too much computation at the client side because the process of re-compressing the decompressed-texture image 312 into the tri-pass-compressed-texture image 316 is much faster since the computationally heavy part of identifying the best endpoint colors for each texel has already been done at the server side during the processing of generating the dual-pass-compressed-texture image 308.

Figure 4:
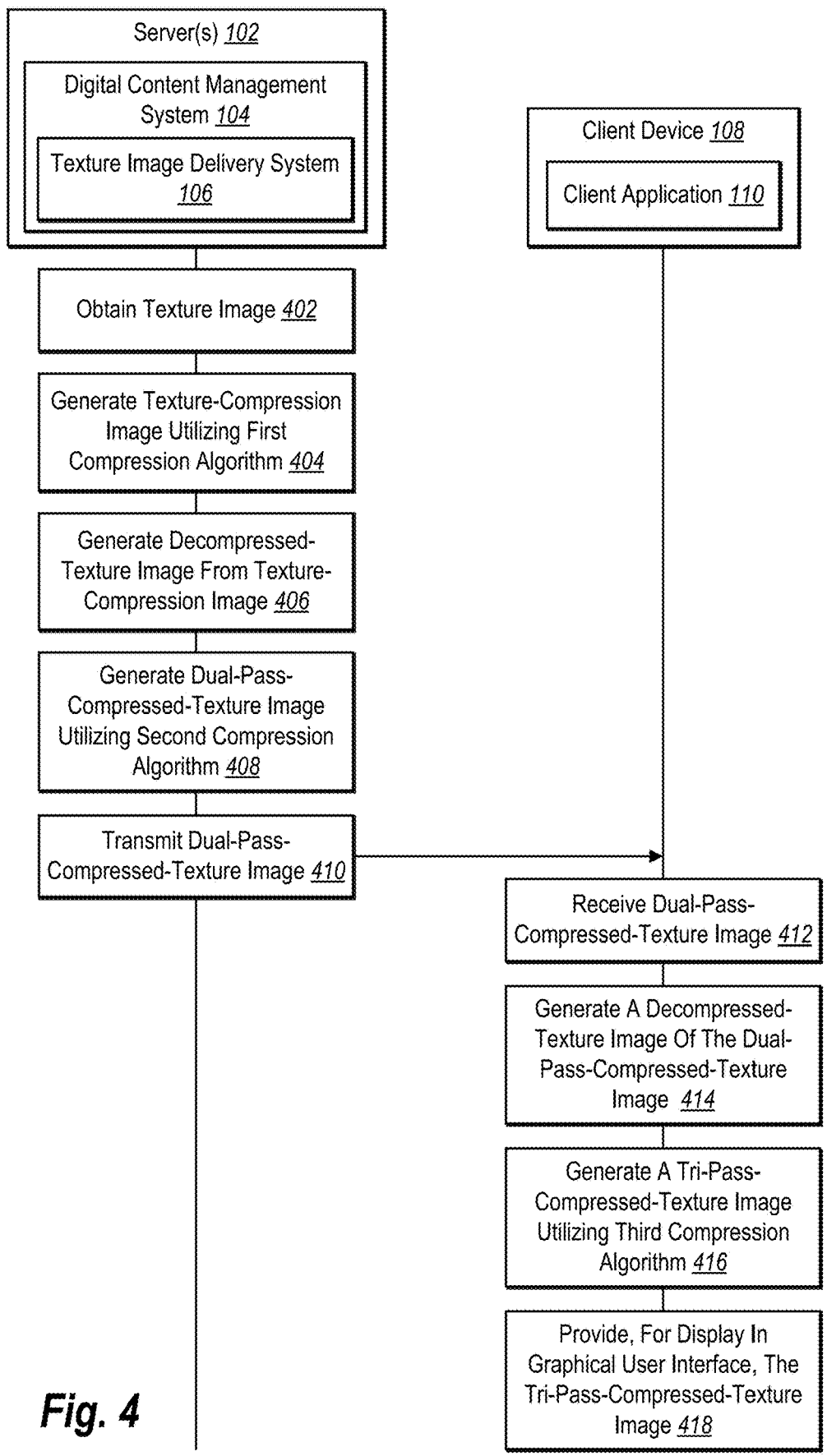
FIG. 4 illustrates a sequence diagram of a texture image delivery system providing a dual-pass-compressed-texture image to a client device for generating and displaying a tri-pass-compressed-texture image in accordance with one or more embodiments.

Thus, the texture image delivery system 106 can provide a network-friendly and GPU-friendly image to a client device for improved performance, including less network bandwidth consumption, decreased computational overhead for faster client-side texture compression, and greater compression format flexibility. These and other performance gains are due in part from the multi-pass compressions at the server-side. FIG. 4 therefore illustrates a sequence diagram of the texture image delivery system 106 providing a dual-pass-compressed-texture image to the client device 108 for generating and displaying a tri-pass-compressed-texture image in accordance with one or more embodiments. Each of the acts are described in detail in relation to the foregoing figures.

As shown in FIG. 4, the texture image delivery system 106 at act 402 obtains a texture image. In some embodiments, obtaining the texture image at act 402 comprises generating the texture image, while in other embodiments, requesting the texture image from a third-party server. Once obtained, the texture image delivery system 106 at act 404 can generate a texture-compression image utilizing a first compression algorithm. For example, utilizing a first compression algorithm (e.g., DXT, BCx, ASTC, etc.) compatible with many types of client devices, the texture image delivery system can compress the texture image obtained at act 402 to generate the texture-compression image. In so doing, the texture image delivery system 106 can reduce each texel's color palettes to four or less colors by defining each color palette according to two respective endpoint pixel colors in the spatial-color domain, thereby imparting GPU-friendly and compatibility-friendly characteristics to the texture-compression image.

In turn, the texture image delivery system 106 at act 406 can generate a decompressed-texture image from the texture-compression image generated at act 404, for instance, by decompressing the texture-compression image using a decompressor. This decompression step at act 406 allows the texture image delivery system 106 to perform act 408 operable in the frequency domain.

At act 408, the texture image delivery system 106 can generate a dual-pass-compressed-texture image utilizing a second compression algorithm. For example, utilizing a second compression algorithm (e.g., HEIC, PNG, WebP, JPEG, etc.) widely available and de-compressible by many types of client devices, the texture image delivery system can compress a decompressed-texture image from act 406 to generate the dual-pass-compressed-texture image. In so doing, the texture image delivery system 106 imparts network-friendly and compatibility-friendly characteristics to the dual-pass-compressed-texture image. Then, at act 410, the texture image delivery system 106 can transmit the dual-pass-compressed-texture image to the client device 108.

At act 412, the client device 108 can receive the dual-pass-compressed-texture image transmitted from the texture image delivery system 106. For example, through the client application 110 and/or a network connection, the client device 108 can communicate with the texture image delivery system 106 to receive the dual-pass-compressed-texture image. In turn, the client device 108 at act 414 can generate a decompressed-texture image of the dual-pass-compressed-texture image, for example, by decoding the second compression technique applied server-side at act 408 to generate the dual-pass-compressed-texture image.

At act 416, the client device 108 can generate a tri-pass-compressed-texture image utilizing a third compression algorithm. In some embodiments, the third compression algorithm comprises an unmodified version of the first compression algorithm used server-side at act 404, such as an NVIDIA-based DXT texture compression algorithm. In other embodiments, the client device 108 may apply, for the third compression algorithm, a modified version of the first compression algorithm used server-side at act 404. In particular, based on the first compression pass applied server-side at act 404, the decompressed-texture image generated at act 414 from the dual-pass-compressed-texture image comprises texels approximately (if not already) in a respective two-endpoint defined color palette. Thus, computational overhead at the client device 108 is greatly reduced in determining the endpoint color values for each texel. Accordingly, in some embodiments, the modified-texture compression algorithm at act 416 leverages acts performed at the server to more quickly select the endpoint color values respectively defining the color palette of each texel. In the cases of minor distortion in which the decompressed-texture image generated at act 414 from the dual-pass-compressed-texture image comprises texels with five or more colors, the client device 108 at act 416 can apply a color reduction algorithm to cluster colors together until obtaining four or less colors for applying a modified compression technique disclosed herein.

In turn, the client device 108 at act 418 can provide the tri-pass-compressed-texture image to the GPU of the client device 108 for rendering and subsequent display in a graphical user interface of the client device 108. Specifically, the client device 108 can display the tri-pass-compressed-texture image as part of a three-dimensional object having a texture visually comprised of the tri-pass-compressed-texture image in addition to other tri-pass-compressed-texture images.

Figure 5:
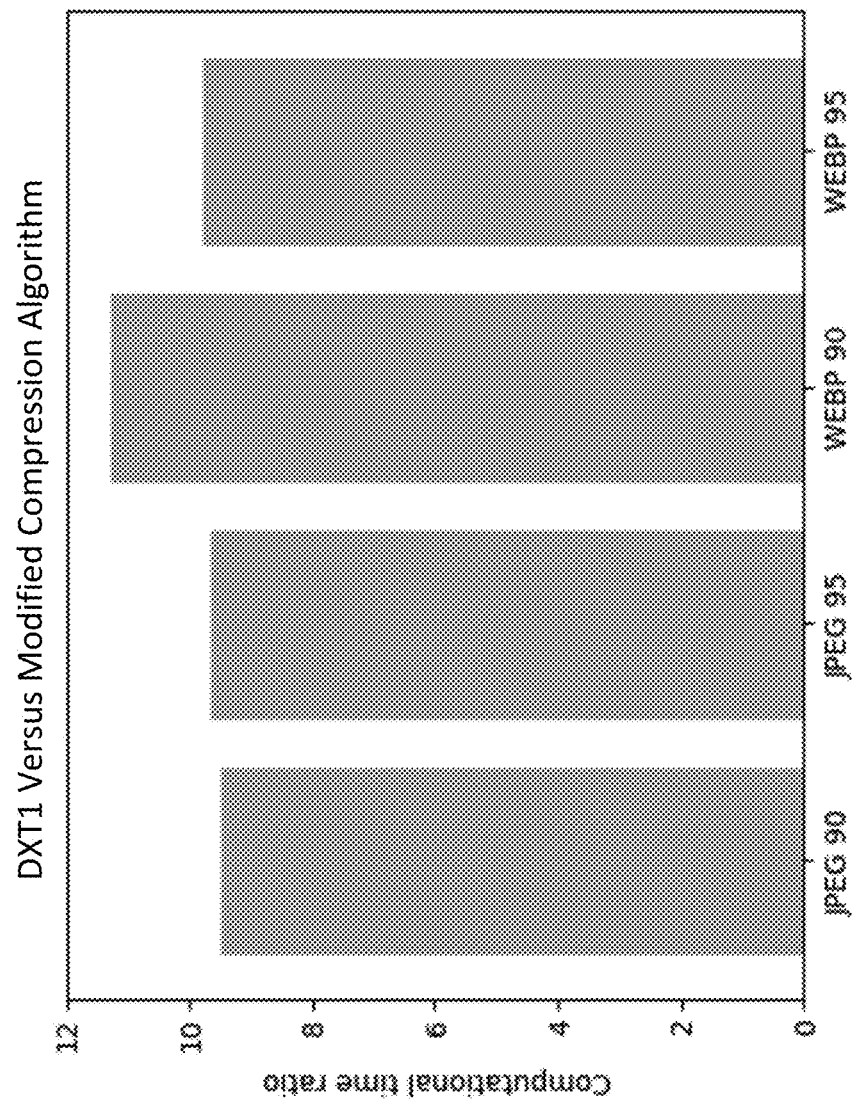
FIG. 5 illustrates a graph reflecting example experimental results regarding the effectiveness of a texture image delivery system in accordance with one or more embodiments.

As described in relation to the foregoing figures, the texture image delivery system 106 imparts GPU-friendly and network-friendly characteristics to a texture image based on the multi-pass compressions applied thereto. FIG. 5 illustrates example experimental results regarding the effectiveness of the texture image delivery system 106 in accordance with one or more embodiments. As shown in FIG. 5, a graph 502 depicts a comparison of the computational time ratios of a third compression pass described above at the client device. The computational time ratios represent the time for compressing sample texels utilizing DXT1 (an NVIDIA-based DXT texture compression algorithm) versus a modified compression algorithm disclosed herein that leverages acts performed by the texture image delivery system 106 to more quickly select (at the client-side) the endpoint color values respectively defining the color palette of each texel. The computational time ratios also account for the time to decompress texels that are compressed according to several network-compression algorithms (JPEG 90, JPEG 95, WebP90, and WebP95, in which the numerical values indicate a quality setting). Accordingly, graph 502 indicates that, relative to using an unmodified DXT1 texture compression, utilizing a modified compression technique disclosed herein results in an approximate 9.6× (or 960%) compression speed gain with JPEG 90, 9.65× (or 965%) compression speed gain with JPEG 95, 11.1× (or 1110%) compression speed gain with WebP90, and 9.7× (or 970%) compression speed gain with WebP 95.

Figure 6:
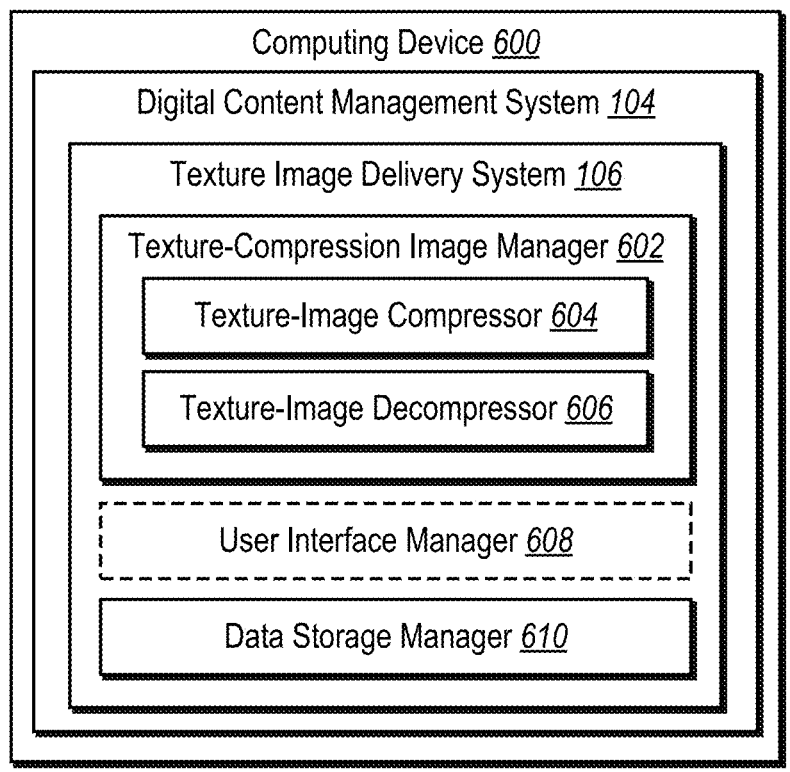
FIG. 6 illustrates an example schematic diagram of a texture image delivery system implemented by a computing device in accordance with one or more embodiments.

Turning to FIG. 6, additional detail will now be provided regarding various components and capabilities of the texture image delivery system 106. In particular, FIG. 6 illustrates an example schematic diagram of the texture image delivery system 106 implemented by a computing device 600 (e.g., the server(s) 102, the client device 108, or a third-party device) in accordance with one or more embodiments of the present disclosure. As shown, the texture image delivery system 106 is further implemented by the digital content management system 104. Also illustrated, the texture image delivery system 106 can include a texture-compression image manager 602, a user interface manager 608, and/or a data storage manager 610.

The texture-compression image manager 602 comprises a texture-image compressor 604 and a texture-image decompressor 606. In particular, the texture-compression image manager 602 can instruct the texture-image compressor 604 to apply one or more compression algorithms, such as DXT, BCx, ASTC, HEIC, PNG, WebP, JPEG, a modified version thereof, etc. to a texture image. For example, in some embodiments, the texture-image compressor 604 may cause the texture-compression image manager 602 to generate a texture-compression image utilizing a first compression algorithm, a dual-pass-compressed-texture image utilizing a second compression algorithm, and/or a tri-pass-compressed-texture image utilizing a third compression algorithm. Further, the texture-compression image manager 602 may instruct the texture-image decompressor 606 to apply one or more decompression algorithms to decode a compression technique. Additionally or alternatively, the texture-compression image manager 602 may cause the texture-image decompressor 606 to generate a decompressed-texture image of the dual-pass-compressed-texture image, for example, by decoding the second compression technique applied server-side to generate the dual-pass-compressed-texture image.

In some embodiments, the computing device 600 comprises the user interface manager 608, for example, in an embodiment where the computing device 600 is the client device 108. The user interface manager 608 can provide, manage, and/or control a graphical user interface (or simply "user interface"). In particular, the user interface manager 608 may generate and display a user interface by way of a display screen composed of a plurality of graphical components, objects, and/or elements that allow a user to perform a function or visualize digital content. For example, the user interface manager 608 can provide, for display, a tri-pass-compressed-texture image as part of a textured object. In another example, the user interface manager 608 can receive user inputs from a user, such as a click or tap to request digital content comprising three-dimensional, textured objects. Additionally, the user interface manager 608 can present a variety of types of information, including text, digital media items, or other information.

The data storage manager 610 maintains data for the texture image delivery system 106. The data storage manager 610 (e.g., via one or more memory devices) can maintain data of any type, size, or kind, as necessary to perform the functions of the texture image delivery system 106, including texture images, textures comprising a plurality of texture images, three-dimensional objects, etc. Additionally or alternatively, the data storage manager 610 may include and/or reference one or more compression libraries for use by the texture-image compressor 604 and/or the texture-image decompressor 606.

Each of the components of the computing device 600 can include software, hardware, or both. For example, the components of the computing device 600 can include one or more instructions stored on a computer-readable storage medium and executable by processors of one or more computing devices, such as a client device or server device. When executed by the one or more processors, the computer-executable instructions of the texture image delivery system 106 can cause the computing device(s) (e.g., the computing device 600) to perform the methods described herein. Alternatively, the components of the computing device 600 can include hardware, such as a special-purpose processing device to perform a certain function or group of functions. Alternatively, the components of the computing device 600 can include a combination of computer-executable instructions and hardware.

Furthermore, the components of the computing device 600 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 600 may be implemented as a stand-alone application, such as a desktop or mobile application. Furthermore, the components of the computing device 600 may be implemented as one or more web-based applications hosted on a remote server.

The components of the computing device 600 may also be implemented in a suite of mobile device applications or "apps." To illustrate, the components of the computing device 600 may be implemented in an application, including but not limited to ADOBE® PHOTOSHOP, ADOBE® AERO, ADOBE® DIMENSION, ADOBE® LIGHTROOM, ADOBE® ILLUSTRATOR, ADOBE® PREMIERE PRO, ADOBE® AFTER EFFECTS, or ADOBE® XD. Product names, including "ADOBE" and any other portion of one or more of the foregoing product names, may include registered trademarks or trademarks of Adobe Inc. in the United States and/or other countries.

Figure 7A:
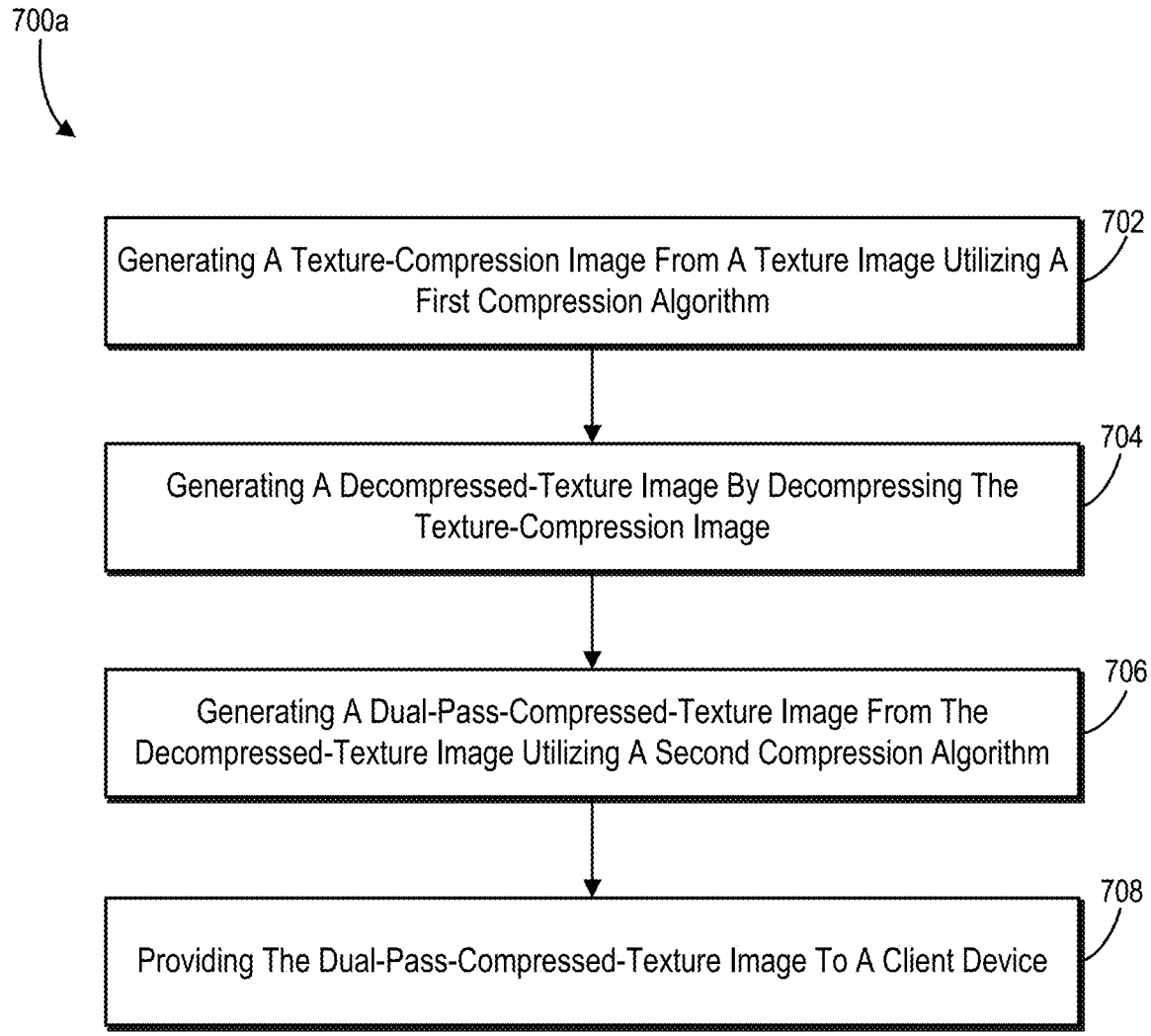
FIG. 7A illustrates a flowchart of a series of acts for providing a dual-pass-compressed-texture image to a client-device in accordance with one or more embodiments.
Figure 7B:
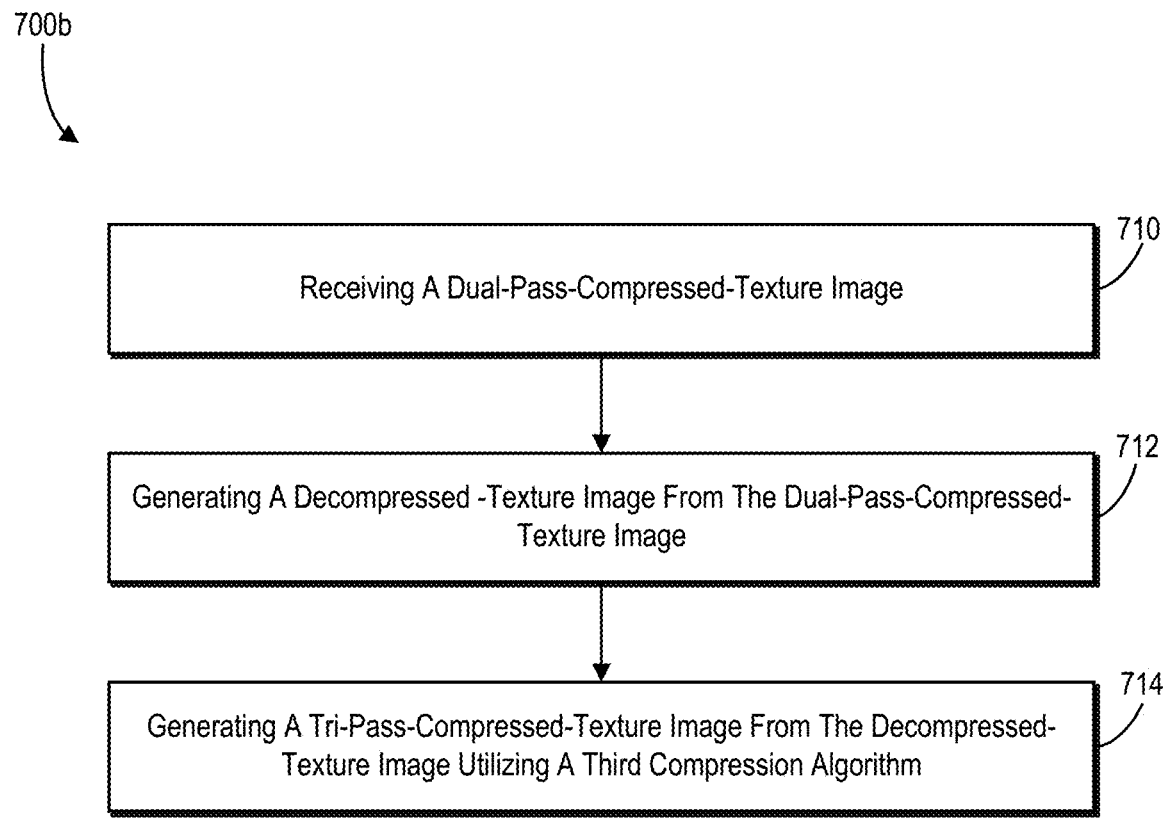
FIG. 7B illustrates a flowchart of a series of acts for generating a tri-pass-compressed-texture image in accordance with one or more embodiments.

FIGS. 1-6, the corresponding text, and the examples provide several different systems, methods, techniques, components, and/or devices of the texture image delivery system 106 in accordance with one or more embodiments. In addition to the above description, one or more embodiments can also be described in terms of flowcharts including acts for accomplishing a particular result. For example, in accordance with one or more embodiments, FIG. 7A illustrates a flowchart of a series of acts 700*a* for providing a dual-pass-compressed-texture image to a client-device, and FIG. 7B illustrates a flowchart of a series of acts 700*b* for generating a tri-pass-compressed-texture image. The texture image delivery system 106 may perform one or more acts of the series of acts 700*a* in addition to or alternatively to one or more acts described in conjunction with other figures. Similarly, the client device 108 may perform one or more acts of the series of acts 700*b* in addition to or alternatively to one or more acts described in conjunction with other figures. While FIGS. 7A-7B illustrate acts according to some embodiments, alternative embodiments may omit, add to, reorder, and/or modify any of the acts shown in FIGS. 7A-7B. The acts of FIGS. 7A-7B can be performed as part of a method. Alternatively, a non-transitory computer-readable medium can comprise instructions that, when executed by one or more processors, cause a computing device to perform the acts of FIGS. 7A-7B. In some embodiments, a system can perform the acts of FIGS. 7A-7B.

As shown, the series of acts 700*a* includes an act 702 of generating a texture-compression image from a texture image utilizing a first compression algorithm. In some embodiments, generating the texture-compression image from the texture image utilizing the first compression algorithm comprises generating the texture-compression image with a plurality of texels respectively comprising pixels of four or less colors. In these or other embodiments, generating the texture-compression image from the texture image utilizing the first compression algorithm comprises utilizing one or more of DXT, block compressions (BCx), or adaptable scalable texture compression (ASTC).

Further, in some embodiments, generating the texture-compression image from the texture image utilizing the first compression algorithm comprises generating reduced color palettes defined according to two respective endpoint pixel colors for each texel in the one or more texture images. In these or other implementations, the texture image delivery system can generate the reduced color palettes defined according to the two respective endpoint pixel colors for each texel in the one or more texture images utilizing one or more of DXT, BCx, or ASTC. For instance, the texture image delivery system can generate the reduced color palettes by blending color values for one or more intermediary pixel colors between the two respective endpoint pixel colors in each texel, and modifying the one or more intermediary pixel colors to correspond to the blended color values in each texel.

Additionally or alternatively, in some embodiments, generating the texture-compression image from the texture image utilizing the first compression algorithm comprises applying one or more texture-compression algorithms operable in a first domain. For example, applying the one or more texture-compression algorithms operable in the first domain comprises applying one or more texture-compression algorithms operable in a spatial-color domain. On the other hand, in some embodiments, generating the dual-pass-compressed-texture image from the decompressed-texture image utilizing the second compression algorithm comprises applying one or more image-compression algorithms operable in a second domain. For example, applying the one or more image-compression algorithms operable in the second domain comprises applying one or more image-compression algorithms operable in a frequency domain.

The series of acts 700*a* further includes an act 704 of generating a decompressed-texture image by decompressing the texture-compression image. In addition, the series of acts 700*a* includes an act 706 of generating a dual-pass-compressed-texture image from the decompressed-texture image utilizing a second compression algorithm. In some embodiments, generating the dual-pass-compressed-texture image from the decompressed-texture image utilizing the second compression algorithm comprises utilizing one or more of high efficiency image compression (HEIC), portable network graphics (PNG), JPEG, or WebP. Additionally or alternatively, generating the dual-pass-compressed-texture image from the decompressed-texture image comprises utilizing a second compression algorithm that operates in a different domain from the first compression algorithm to generate a dual-pass-compressed-texture image. The series of acts 700*a* also includes an act 708 of providing the dual-pass-compressed-texture image to a client device, for example, by transmitting the dual-pass-compressed-texture image via a network connection to the client device.

It is understood that the outlined acts in the series of acts 700*a* are only provided as examples, and some of the acts may be optional, combined into fewer acts, or expanded into additional acts without detracting from the essence of the disclosed embodiments.

With respect to FIG. 7B, the series of acts 700*b* includes an act 710 of receiving a dual-pass-compressed-texture image. The series of acts 700*b* further includes an act 712 of generating a decompressed-texture image from the dual-pass-compressed-texture image by decoding a second compression technique applied to generate the dual-pass-compressed-texture image, the decompressed-texture image comprising a first plurality of texels with respective color palettes based on once reduced color palettes generated by a first compression technique.

In addition, the series of acts 700*b* includes an act 714 of generating a tri-pass-compressed-texture image from the decompressed-texture image utilizing a third compression algorithm to generate a second plurality of texels respectively comprising pixels having a number of colors equal to or less than a texel dimension of the texels. In some embodiments, generating the tri-pass-compressed-texture image utilizing the third compression algorithm comprises determining a number of colors of pixels in each texel of the first plurality of texels. For example, generating the tri-pass-compressed-texture image utilizing the third compression algorithm comprises: determining the number of colors of pixels in at least one texel of the first plurality of texels is equal to or less than the texel dimension; selecting endpoint color values within the at least one texel that define a line having a least distance to intermediate color values; and generating a color palette for the at least one texel based on the selected endpoint color values.

Additionally or alternatively, in some embodiments, generating the tri-pass-compressed-texture image utilizing the third compression algorithm comprises: determining the number of colors of pixels in at least one texel of the first plurality of texels exceeds the texel dimension; and applying a color reduction algorithm to the at least one texel to cluster the colors of the at least one texel into the number of colors equal to or less than the texel dimension. In these or other embodiments, applying the color reduction algorithm comprises modifying one or more color values until mapping to a shared color value, for example, by iteratively applying rounded integer division to the one or more color values.

In some embodiments, generating the tri-pass-compressed-texture image utilizing the third compression algorithm comprises applying one or more of DXT, BCx, or ASTC to the decompressed-texture image. In these or other embodiments, generating the tri-pass-compressed-texture image utilizing the third compression algorithm comprises generating the tri-pass-compressed-texture image such that each texel of the second plurality of texels is independently accessible by a graphics processing unit of the computing device.

It is understood that the outlined acts in the series of acts 700*b* are only provided as examples, and some of the acts may be optional, combined into fewer acts, or expanded into additional acts without detracting from the essence of the disclosed embodiments. Additionally, the acts of the series of acts 700*b* described herein may be repeated or performed in parallel with one another or in parallel with different instances of the same or similar acts. As an example of an additional act not shown in FIG. 7B, act(s) in the series of acts 700*b* may include causing the computing device to receive the dual-pass-compressed-texture image at a central processing unit (CPU) of the computing device. As another example of an additional act not shown in FIG. 7B, act(s) in the series of acts 700*b* may include providing the tri-pass-compressed-texture image from the CPU to a graphics processing unit of the computing device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
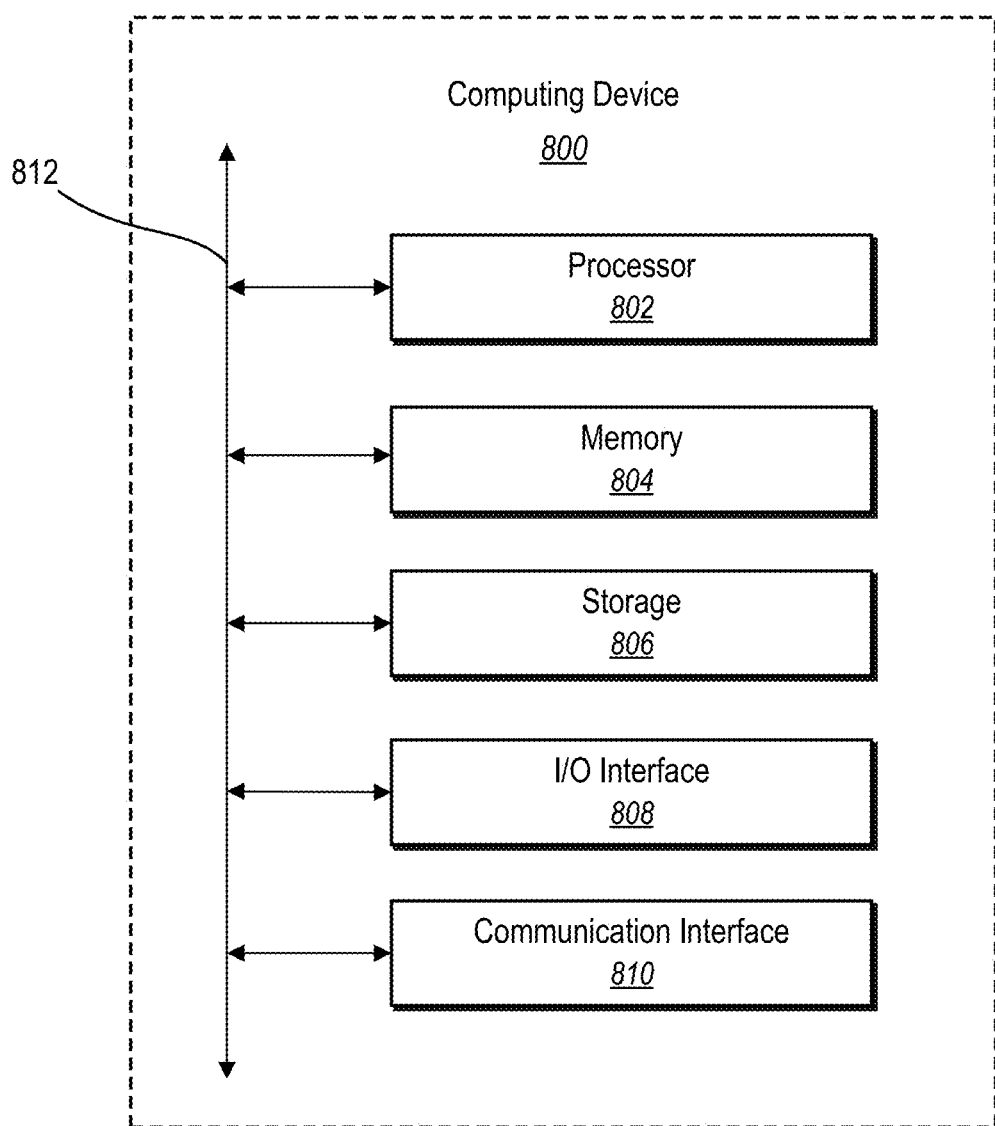
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the computing device 600, the server(s) 102, and/or the client device 108). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of the computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method to provide a dual-pass-compressed-texture image to a client device by:
   generating a texture-compression image from a texture image utilizing a first compression algorithm by generating reduced color palettes defined according to a number of endpoint pixel colors for each texel in the texture image by:
      blending color values for one or more intermediary pixel colors between the endpoint pixel colors in each texel; and
      modifying the one or more intermediary pixel colors to correspond to the blended color values in each texel;
   generating a decompressed-texture image by decompressing the texture-compression image;
   generating a dual-pass-compressed-texture image from the decompressed-texture image utilizing a second compression algorithm; and
   providing the dual-pass-compressed-texture image to a client device over a network.

2. The computer-implemented method of claim 1, wherein generating the texture-compression image from the texture image utilizing the first compression algorithm comprises generating the texture-compression image with a plurality of texels respectively comprising pixels having a number of colors equal to or less than a dimension of the texels.

3. The computer-implemented method of claim 1, wherein generating the texture-compression image from the texture image utilizing the first compression algorithm comprises utilizing one or more of DXT, block compressions (BCx), or adaptable scalable texture compression (ASTC).

4. The computer-implemented method of claim 1, wherein:
   generating the texture-compression image from the texture image utilizing the first compression algorithm comprises applying one or more texture-compression algorithms operable in a first domain; and
   generating the dual-pass-compressed-texture image from the decompressed-texture image utilizing the second compression algorithm comprises applying one or more image-compression algorithms operable in a second domain.

5. The computer-implemented method of claim 4, wherein:
   applying the one or more texture-compression algorithms operable in the first domain comprises applying one or more texture-compression algorithms operable in a spatial-color domain; and
   applying the one or more image-compression algorithms operable in the second domain comprises applying one or more image-compression algorithms operable in a frequency domain.

6. The computer-implemented method of claim 1, wherein generating the dual-pass-compressed-texture image from the decompressed-texture image utilizing the second compression algorithm comprises utilizing one or more of high efficiency image compression (HEIC), portable network graphics (PNG), JPEG, or WebP.

7. A system comprising:
one or more memory devices comprising texture images; and
one or more server devices configured to cause the system to:
compress one or more of the texture images utilizing a first compression algorithm to generate a texture-compression image by generating reduced color palettes by:
blending color values for one or more intermediary pixel colors between endpoint pixel colors in each texel; and
modifying the one or more intermediary pixel colors to correspond to the blended color values in each texel;
decompress the texture-compression image to generate a decompressed-texture image;
compress the decompressed-texture image utilizing a second compression algorithm to generate a dual-pass-compressed-texture image; and
provide the dual-pass-compressed-texture image to a client device by transmitting the dual-pass-compressed-texture image via a network to the client device.

8. The system of claim 7, wherein the one or more server devices are configured to cause the system to compress the one or more texture images utilizing the first compression algorithm by generating reduced color palettes defined according to a number of endpoint pixel colors for each texel in the one or more texture images.

9. The system of claim 7, wherein the one or more server devices are configured to cause the system to generate the reduced color palettes defined according to a number of endpoint pixel colors for each texel in the one or more texture images utilizing one or more of DXT, BCx, or ASTC.

10. The system of claim 7, wherein compressing one or more of the texture images utilizing a first compression algorithm comprises applying one or more texture-compression algorithms operable in a first domain; and
compressing the decompressed-texture image utilizing a second compression algorithm comprises applying one or more image-compression algorithms operable in a second domain.

11. The system of claim 10 wherein:
applying the one or more texture-compression algorithms operable in the first domain comprises applying one or more texture-compression algorithms operable in a spatial-color domain.

12. The system of claim 10, wherein:
applying the one or more image-compression algorithms operable in the second domain comprises applying one or more image-compression algorithms operable in a frequency domain.

13. The system of claim 7, wherein compressing decompressed-texture image utilizing a second compression algorithm to generate a dual-pass-compressed-texture image comprises utilizing one or more of high efficiency image compression (HEIC), portable network graphics (PNG), JPEG, or WebP.

14. A non-transitory computer-readable medium storing instructions that, when executed by at least one processor, cause the at least one processor to perform operations comprising:
generating a texture-compression image from a texture image utilizing a first compression algorithm by generating reduced color palettes defined according to a number of endpoint pixel colors for each texel in the texture image by:
blending color values for one or more intermediary pixel colors between endpoint pixel colors in each texel; and
modifying the one or more intermediary pixel colors to correspond to the blended color values in each texel;
generating a decompressed-texture image by decompressing the texture-compression image;
generating a dual-pass-compressed-texture image from the decompressed-texture image utilizing a second compression algorithm; and
providing the dual-pass-compressed-texture image to a client device over a network.

15. The non-transitory computer-readable medium of claim 14, wherein the reduced color palettes comprise four or less colors.

16. The non-transitory computer-readable medium of claim 14, wherein the operations comprise generating the reduced color palettes defined according to the number of endpoint pixel colors for each texel in the texture image utilizing one or more of DXT, BCx, or ASTC.

17. The non-transitory computer-readable medium of claim 14, wherein generating the texture-compression image from the texture image utilizing the first compression algorithm comprises applying one or more texture-compression algorithms operable in a first domain; and
compressing the decompressed-texture image utilizing a second compression algorithm to generate a dual-pass-compressed-texture image comprises applying one or more image-compression algorithms operable in a second domain.

18. The non-transitory computer-readable medium of claim 17, wherein:
applying the one or more texture-compression algorithms operable in the first domain comprises applying one or more texture-compression algorithms operable in a spatial-color domain.

19. The non-transitory computer-readable medium of claim 17, wherein:
applying the one or more image-compression algorithms operable in the second domain comprises applying one or more image-compression algorithms operable in a frequency domain.

20. The non-transitory computer-readable medium of claim 14, wherein compressing the decompressed-texture image utilizing a second compression algorithm to generate a dual-pass-compressed-texture image comprises utilizing one or more of high efficiency image compression (HEIC), portable network graphics (PNG), JPEG, or WebP.

* * * * *